July 19, 1938.  J. SCHOTT  2,124,263

FISHHOOK

Filed March 31, 1937

John Schott, INVENTOR
BY Victor J. Evans & Co.
ATTORNEY

Patented July 19, 1938

2,124,263

UNITED STATES PATENT OFFICE 2,124,263

FISHHOOK

John Schott, Archbald, Pa.

Application March 31, 1937, Serial No. 134,136

3 Claims. (Cl. 43—36)

This invention relates to fish hooks and has for its object the provision of a hook which will not be easily caught in snags or weeds but which will readily embed itself in the flesh of a fish's mouth and will securely hold a fish which takes or tries to take the bait. A fish hook embodying the invention is illustrated in the accompanying drawing and will be hereinafter first fully described and then more particularly defined in the appended claims.

Figure 2:
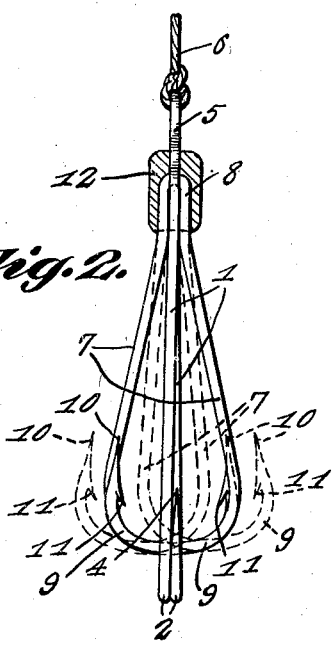
Figure 2 is a similar view at a right angle to Figure 1.
Figure 3:
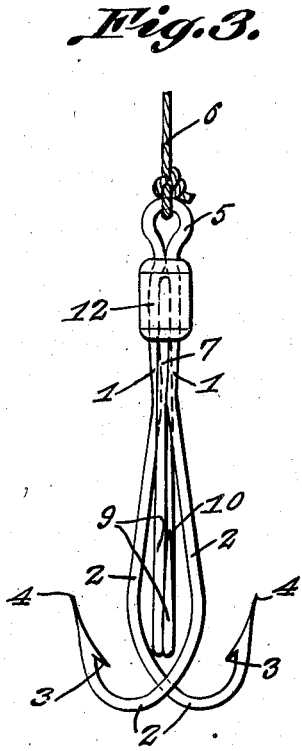
Figure 3 is an elevation from the same view point as Figure 1 with the hook open.
Figure 4:
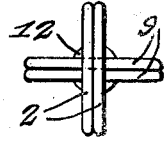
Figure 4 is a bottom plan view.

The hook comprises two like members, each having a shank 1 and a bow 2, the bow having a barb 3 on its inner side adjacent the point 4. The shanks are joined by an eye 5 in which the line 6 is secured, and immediately below the eye they are spaced apart and then continue on parallel lines for about approximately one-half their length before diverging and then curving toward each other to form the bows. It is to be particularly noted that the bows lie close together side by side so that in the closed position, seen in Figure 1, the bow of one hook forms a guard for the barbed point of the other hook and the device may be drawn through the water without likelihood of being caught in weeds or snags, but when a fish closes his mouth upon the baited hooks the shanks will be pressed together and the points exposed, as in Figure 3, to impale the fish. Disposed between and at a right angle to the shanks 1 is a second pair of shanks 7 shorter than the shanks 1 and also integrally united, as shown at 8 in Figure 2. The shanks 7 diverge and then bend toward and past each other to form bows 9 terminating in points 10 having barbs 11. Like the larger outer hooks, the bows 9 are side by side and close together so that the bow of one hook forms a guard for the point of the other hook. Just below the eye 5, a clamping collar 12 is fitted tightly around the shanks to secure them firmly together and prevent separation of the inner hooks from the outer hooks with probable loss of the inner hooks.

Figure 1:
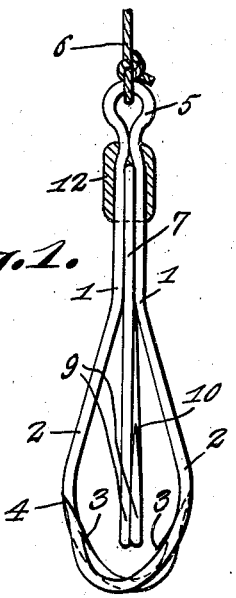
Figure 1 is an elevation, partly in section, of the improved hook.

The several hooks may be baited in the usual manner and the spring temper of the hooks is such that it tends to hold the mating members in the closed position shown in Figure 1. When a fish takes the bait, his jaws close upon the shanks and bows so that the shanks will be pressed toward each other as shown by dotted lines in Figure 2 and full lines in Figure 3, the points being thereby exposed and driven into the flesh of the mouth to securely hold the fish.

It will be readily seen from the foregoing description, taken in connection with the accompanying drawing, that I have provided a very simple device which is highly efficient for the purpose for which it is designed.

Having described my invention, what I claim is:

1. A fish hook including like members integrally united at one end and having bows at the opposite ends terminating in barbed points, the bows being close together and side by side whereby the bow of one member forms a guard for the point of the other member.

2. A fish hook comprising a set of like members having shanks integrally united in a line-attaching eye at one end, the opposite ends of the shanks merging into bows terminating in oppositely extending barbed points, and another set of like members having integrally united shanks held between and perpendicular to the first-mentioned shanks, the last-mentioned shanks having their free ends forming bows terminating in oppositely extending barbed points, the bows of one set of like members embracing the other set of like members for protecting the barbed points of the latter.

3. A fish hook comprising like members having shanks integrally united in a line-attaching eye at one end, the opposite ends of the shanks merging into bows terminating in oppositely extending barbed points, and other like members having integrally united shanks held between and perpendicular to the first-mentioned shanks, the last-mentioned shanks having their free ends forming bows terminating in oppositely extending barbed points, and a collar secured around the outer shanks at the united ends of the inner shanks whereby to secure all of the shanks together.

JOHN SCHOTT.